(12) United States Patent
Shiozawa

(10) Patent No.: US 11,683,058 B2
(45) Date of Patent: Jun. 20, 2023

(54) SIGNAL DETECTION APPARATUS, RECEPTION APPARATUS, AND SIGNAL DETECTION METHOD

(71) Applicant: JVCKENWOOD Corporation, Yokohama (JP)

(72) Inventor: Hideaki Shiozawa, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 17/677,509

(22) Filed: Feb. 22, 2022

(65) Prior Publication Data

US 2022/0302941 A1 Sep. 22, 2022

(30) Foreign Application Priority Data

Mar. 22, 2021 (JP) .............................. JP2021-046736

(51) Int. Cl.
*H04B 1/12* (2006.01)

(52) U.S. Cl.
CPC .................................. *H04B 1/123* (2013.01)

(58) Field of Classification Search
CPC ................................ H04B 1/123; H04L 27/38
See application file for complete search history.

(56) References Cited

U.S. PATENT DOCUMENTS

| 4,972,430 A * | 11/1990 | Cantwell ................ H04K 3/228 375/345 |
| 7,548,735 B1 * | 6/2009 | Sullivan ............... H04B 1/1027 455/67.11 |
| 2009/0262924 A1 * | 10/2009 | Nakamiya ........... H04L 27/0006 379/386 |
| 2013/0083931 A1 * | 4/2013 | Higure .................... H04R 3/00 381/56 |

FOREIGN PATENT DOCUMENTS

JP 2011-135208 A 7/2011

\* cited by examiner

*Primary Examiner* — Dac V Ha
(74) *Attorney, Agent, or Firm* — Shih IP Law Group, PLLC

(57) ABSTRACT

In a signal detection apparatus, a quadrature detection circuit subjects a reception signal to quadrature detection. An intensity detection circuit detects a signal intensity by referring to an absolute value of an amplitude of a signal subjected to quadrature detection. A zero cross detection circuit detects the number of times of zero crosses of the signal in a predetermined period of time that is based on a modulation index of the reception signal. A signal determination circuit that determines that the signal is the reception signal when the signal intensity is equal to or higher than a threshold value and the number of times of zero crosses is within a predetermined range.

5 Claims, 7 Drawing Sheets

RESULT OF ZERO
CROSS DETECTION

RESULT OF ZERO
CROSS DETECTION

FIG. 7

| SET CHANNEL | CH1 | CH2 | CH3 | |
|---|---|---|---|---|
| DETERMINATION BY SIGNAL DETERMINATION UNIT 40 | NO SIGNALS | NO SIGNALS | NO SIGNALS | |
| DETERMINATION BY NOISE SQUELCH DETERMINATION UNIT 32 | NOT PERFORMED | NOT PERFORMED | NOT PERFORMED | |
| | FIRST TIME | FIRST TIME | FIRST TIME | |

SIGNAL DETECTION APPARATUS, RECEPTION APPARATUS, AND SIGNAL DETECTION METHOD

CROSS-REFERENCE TO RELATED APPLICATION

This application is based upon and claims the benefit of priority from the prior Japanese Patent Application No. 2021-046736, filed on Mar. 22, 2021, the entire contents of which are incorporated herein by reference.

BACKGROUND

1. Field

The present invention relates to signal detection technology, and, more particularly, to a signal detection apparatus, a reception apparatus, and a signal detection method.

2. Description of the Related Art

A wireless apparatus performs a signal detection process and performs a reception operation when a signal is detected. In the related art, signal detection is performed in two stages including received signal strength indication (RSSI) and squelch (see, for example, patent document 1).
[Patent literature 1] JP2011-135208

When an antenna is mounted, it is highly probable, due to an impact from the noise around, that RSSI detection results in a determination that a signal is identified. Therefore, a squelch detection process is frequently performed. Further, squelch determination requires about 60 ms for a demodulation process or a process to integrate a noise signal so that the speed of signal detection drops.

SUMMARY

A signal detection apparatus according to an embodiment includes: a quadrature detection circuit that subjects a reception signal to quadrature detection; an intensity detection circuit that detects a signal intensity by referring to an absolute value of an amplitude of a signal subjected to quadrature detection; a zero cross detection circuit that detects the number of times of zero crosses of the signal in a predetermined period of time that is based on a modulation index of the reception signal; and a signal determination circuit that determines that the signal is the reception signal when the signal intensity is equal to or higher than a threshold value and the number of times of zero crosses is within a predetermined range.

Another embodiment of the present invention relates to a reception apparatus. The apparatus includes: a quadrature detection circuit that subjects a reception signal to quadrature detection; an FM detection circuit that subjects a signal subjected to quadrature detection by the quadrature detection circuit to FM detection so as to generate a detection signal; a noise squelch determination circuit that detects a noise level outside a demodulation bandwidth of the detection signal generated by the FM detection circuit and determines whether the signal subjected to quadrature detection is the reception signal, based on the noise level detected; an audio control circuit that controls a sound signal based on the detection signal generated by the FM detection circuit to be or not to be output; and a signal detection circuit that detects whether the reception signal is identified. The signal detection circuit includes: an intensity detection circuit that detects a signal intensity by referring to an absolute value of an amplitude of the signal subjected to quadrature detection; a zero cross detection circuit that detects the number of times of zero crosses of the signal in a predetermined period of time that is based on a modulation index of the reception signal or the number of times of zero crosses of a differential signal derived from differentiating the signal subjected to quadrature detection in a predetermined period of time that is based on the modulation index of the reception signal; and a signal determination circuit that determines that the signal subjected to quadrature detection is the reception signal when the signal intensity is equal to or higher than a threshold value and the number of times of zero crosses is within a predetermined range. The audio control circuit does not output the sound signal when the signal determination circuit determines that the reception signal is not identified, does not output the sound signal when the signal determination circuit determines that the reception signal is identified and the noise squelch determination circuit determines that the reception signal is not identified, and outputs the sound signal when the signal determination circuit determines that the reception signal is identified and the noise squelch determination circuit determines that the reception signal is identified.

Still another embodiment of the present invention relates to a signal detection method. The method includes: subjecting a reception signal to quadrature detection; detecting a signal intensity by referring to an absolute value of an amplitude of a signal subjected to quadrature detection; detecting the number of times of zero crosses of the signal in a predetermined period of time that is based on a modulation index of the reception signal or the number of times of zero crosses of a differential signal derived from differentiating the signal subjected to quadrature detection in a predetermined period of time that is based on the modulation index of the reception signal; and determining that the signal is the reception signal when the signal intensity detected is equal to or higher than a threshold value and the number of times of zero crosses detected is within a predetermined range.

Optional combinations of the aforementioned constituting elements, and implementations of the embodiments in the form of methods, apparatuses, systems, recording mediums, and computer programs may also be practiced as additional modes of the embodiments.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIG. 7 shows an operation of the channel scan control unit of FIG. 1 in the absence of signals;

DETAILED DESCRIPTION

The invention will now be described by reference to the preferred embodiments. This does not intend to limit the scope of the present invention, but to exemplify the invention.

A summary of an embodiment will be given before describing the embodiment in specific detail. The embodiment relates to a reception apparatus for receiving a radio signal. The reception apparatus performs, for example, quadrature detection of direct conversion type. As described above, RSSI detection results in a determination that a signal is identified in an environment of no signals and large ambient noise, and it is determined that a signal is not identified in the subsequent noise squelch determination process. Therefore, a long period of time is required before it is ultimately determined that a signal is not identified. Therefore, the scan speed in channel scan drops, and a standby current is increased, too. To address this, the reception apparatus according to the embodiment discriminates between a signal and a noise with a high precision, based on the number of times of zero crosses of a signal subjected to quadrature detection.

Figure 1:
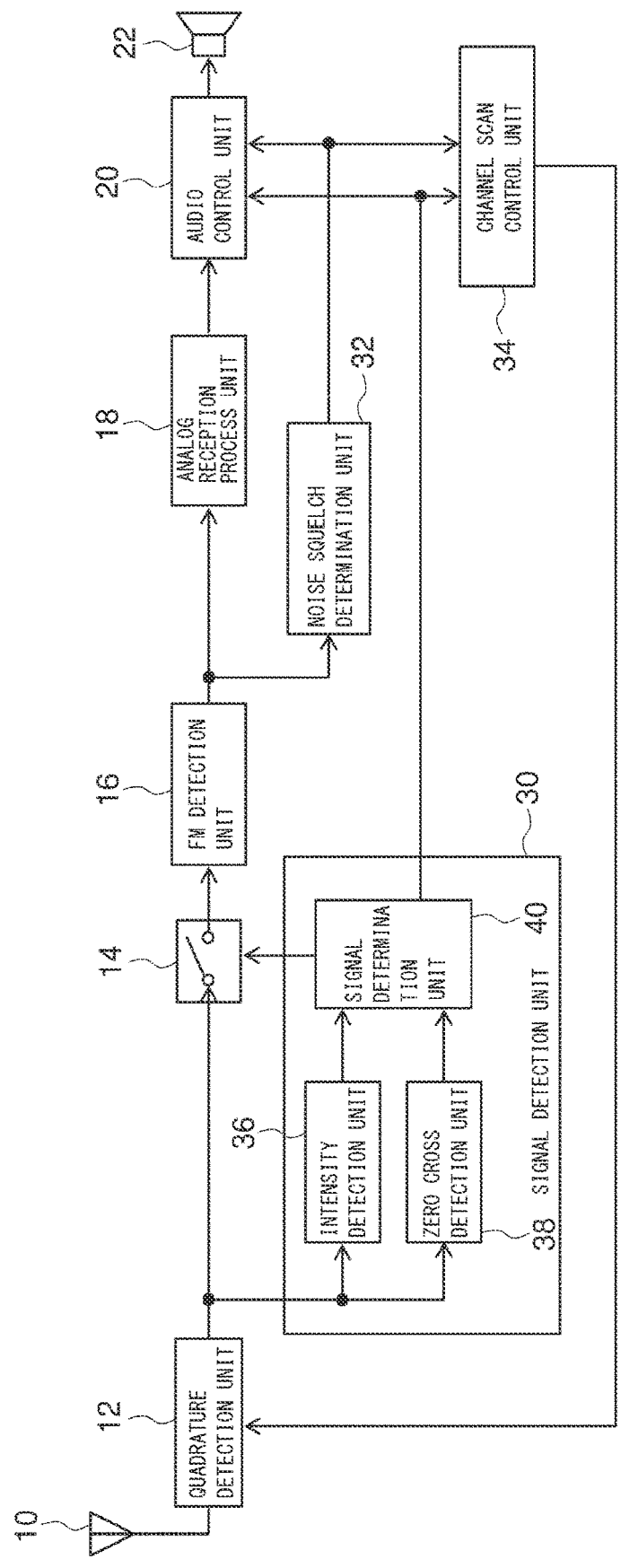
FIG. 1 shows a configuration of a reception apparatus according to an embodiment.

FIG. 1 shows a configuration of a reception apparatus according to the embodiment. The reception apparatus 1 includes an antenna 10, a quadrature detection unit 12, a switching unit 14, an FM detection unit 16, an analog reception process unit 18, an audio control unit 20, a speaker 22, a signal detection unit 30, a noise squelch determination unit 32, and a channel scan control unit 34. The signal detection unit 30 includes an intensity detection unit 36, a zero cross detection unit 38, and a signal determination unit 40.

The antenna 10 receives a radio frequency (RF) signal from a transmission apparatus (not shown). The RF signal is optionally FM modulated, but the embodiment is non-limiting as to the feature. The antenna 10 outputs the received RF signal to the quadrature detection unit 12.

The quadrature detection unit 12 subjects an RF signal from the antenna 10 to quadrature detection to generate an I-phase baseband signal (hereinafter, "I signal") and a Q-phase baseband signal orthogonal to the I-phase baseband signal (hereinafter, "Q signal"). The quadrature detection unit 12 outputs the I signal and the Q signal thus generated to the switching unit 14, the intensity detection unit 36, and the zero cross detection unit 38. A publicly known technology may be used in the process in the quadrature detection unit 12, and a detailed description will be omitted. The quadrature detection unit 12 is, for example, comprised of an analog device. Quadrature detection may be performed by a digital signal process.

The configuration of the switching unit 14, the FM detection unit 16, the analog reception process unit 18, the audio control unit 20, the signal detection unit 30, the noise squelch determination unit 32, and the channel scan control unit 34 can be implemented in hardware such as a DSP and a CPU, a memory, or other LSIs of any computer and in software such as a program loaded in a memory. The figure depicts functional blocks implemented by the coordination of these elements. Therefore, it will be understood by those skilled in the art that the functional blocks may be implemented in a variety of manners by hardware only, software only, or by a combination of hardware and software. The quadrature detection unit 12 may be a quadrature detection circuit, the switching unit 14 may be a switching circuit, and the FM detection unit 16 may be an FM detection circuit. The analog reception process unit 18 may be an analog reception process circuit, the audio control unit 20 may be an audio control circuit, and the signal detection unit 30 may be a signal detection circuit. The noise squelch determination unit 32 may be a noise squelch determination circuit, and the channel scan control unit 34 may be a channel scan control circuit. The intensity detection unit 36 may be an intensity detection circuit, the zero cross detection unit 38 may be a zero cross detection circuit, and the signal determination unit 40 may be a signal determination circuit.

The signal detection unit 30 detects a signal based on at least one of the I signal and the Q signal. The intensity detection unit 36 and the zero cross detection unit 38 receives at least one of the I signal and the Q signal subjected to quadrature detection and sampled according to a predetermined timing schedule. The I signal and the Q signal are band-limited by a band limitation filter.

The intensity detection unit 36 detects the intensity of the signal subjected to quadrature detection and outputs the detected intensity to the signal determination unit 40. The intensity detection unit 36 determines the absolute value of the amplitude of at least one of the I signal and the Q signal and detects the intensity of the signal subjected to quadrature detection based on the determined absolute value. The intensity detection unit 36 may calculate a square-root of sum of squares or a sum of squares of the I signal and the Q signal to identify the absolute value of the output of the quadrature detection unit 12 and may define the absolute value to be the intensity of the signal subjected to quadrature detection. The intensity of the signal subjected to quadrature detection represents a relationship relative to the RF signal level and is equivalent to RSSI. In other words, the intensity detection unit 36 can be said to detect RSSI based on the I signal and the Q signal received. The intensity detection unit 36 can be said to be an RSSI detection unit or a carrier squelch process unit.

Figure 2:
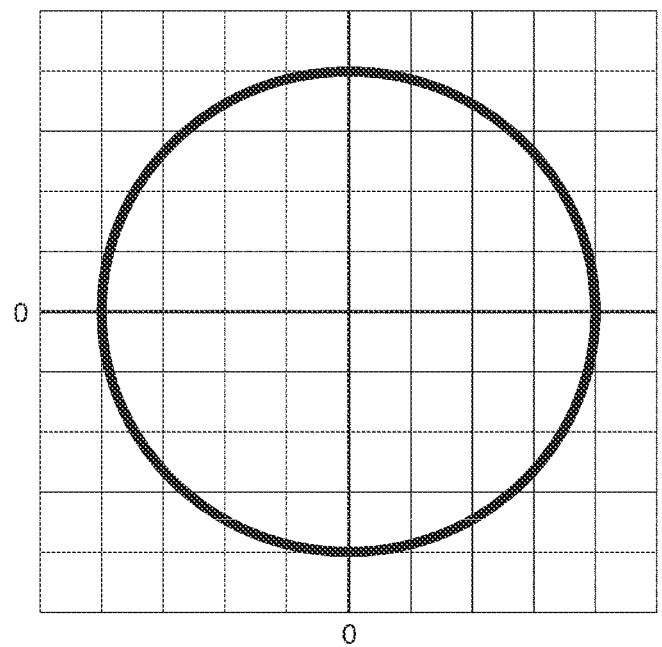
FIG. 2 shows an example of a constellation of the I signal and the Q signal generated by the quadrature detection unit of FIG. 1.

FIG. 2 shows an example of a constellation of the I signal and the Q signal generated by the quadrature detection unit 12 of FIG. 1. The horizontal axis represents the I axis, and the vertical axis represents the Q axis. FIG. 2 shows an example in which an FM-modulated RF signal of a constant intensity is received, and the constellation is a circle around the origin. The radius of the circle represents the electric field intensity. The FM-modulated RF signal will be referred to as a desired wave.

Figure 3:
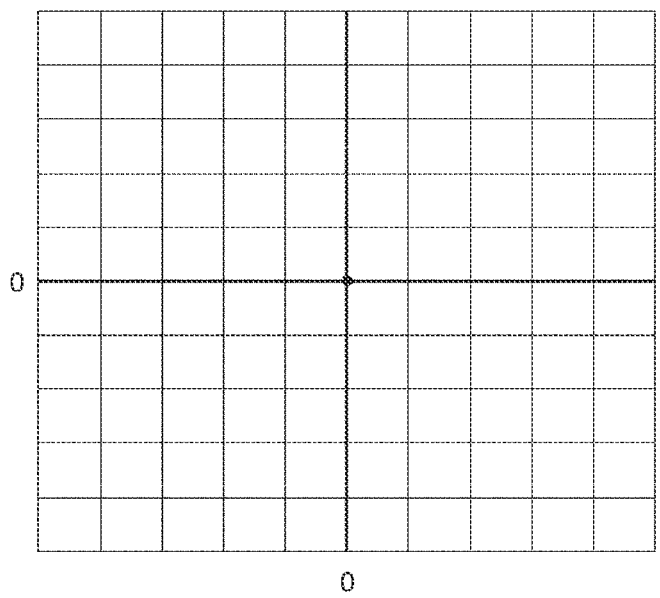
FIG. 3 shows another example of a constellation of the I signal and the Q signal.

FIG. 3 shows another example of a constellation of the I signal and the Q signal. FIG. 3 shows a case of no signals and a relatively low level of ambient noise. No signals means that a desired wave is not identified. The constellation is a point having a small radius defined by the level of ambient noise.

Figure 4:
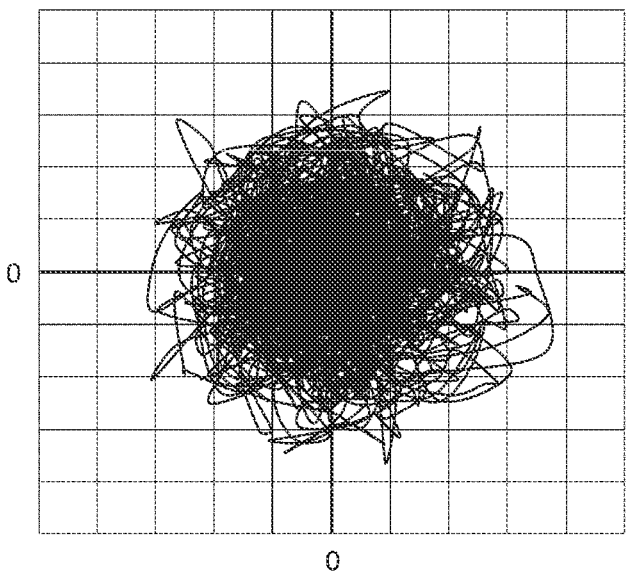
FIG. 4 shows still another example of a constellation of the I signal and the Q signal.

FIG. 4 shows still another example of a constellation of the I signal and the Q signal. FIG. 4 shows a case of no signals and a level of ambient noise higher than the example of FIG. 3. The constellation approximates a filled circle having a radius larger than that of FIG. 3. The higher the level of ambient noise, the larger the radius of the filled circle and the higher the probability that the signal intensity detected by the intensity detection unit 36 is high. Therefore, it is difficult to discriminate between a constellation as shown in FIG. 2 formed by an FM signal and a constellation as shown in FIG. 4 formed by ambient noise according to determination based only on signal intensity.

In this embodiment, a constellation as shown in FIG. 2 formed by an FM signal and a constellation as shown in FIG. 4 formed by ambient noise are discriminated in a period of time of determination commensurate with that of carrier squelch determination, by using the number of times of zero crosses of a signal subjected to quadrature detection.

Reference is made back to FIG. 1. The zero cross detection unit 38 detects the number of times of zero crosses of a signal subjected to quadrature detection in a predetermined period of time and outputs the number of times of zero crosses to the signal determination unit 40. To describe it further details, the zero cross detection unit 38 detects the number of times of zero crosses of at least one of the I signal and the Q signal in a predetermined period of time. The number of times of zero crosses is a sum of the number of times that the value of the signal changes from positive to negative via zero and the number of times that the value of the signal changes from negative to positive via zero. The number of times of zero crosses can be said to be the number of times of changes that the plus and minus sings of the signal change. The predetermined period of time may be, for example, equal to a period of time required for the intensity detection unit 36 to detect the signal intensity and may be determined by simulation computation, etc. The predetermined period of time may be defined based on the modulation index of the desired wave.

Figure 5:
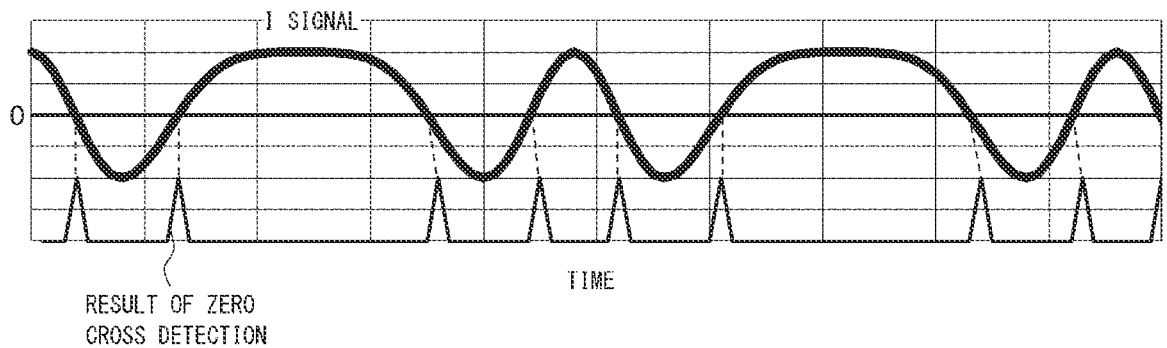
FIG. 5 shows an example of a waveform of the I signal and a result of detecting zero crosses when a desired wave is received.
Figure 6:
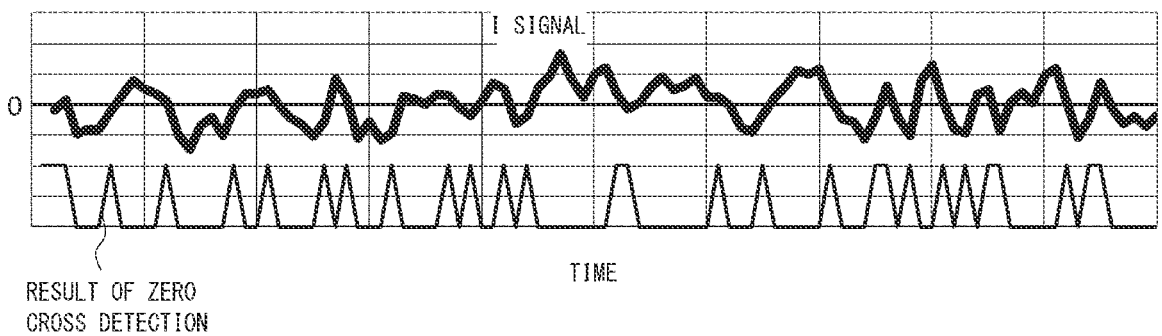
FIG. 6 shows an example of a waveform of the I signal and a result of detecting zero crosses in the absence of signals.

FIG. 5 shows an example of a waveform of the I signal and a result of detecting zero crosses when a desired wave is received. FIG. 6 shows an example of a waveform of the I signal and a result of detecting zero crosses in the absence of signals. The vertical axis represents the voltage value of the I signal, and the horizontal axis represents time. The scales of the vertical and horizontal axes are identical in FIGS. 5 and 6. The figures show that zero cross is detected at a point of time when the value of zero cross detection result is increased. Displacement between a point of time of zero cross of the I signal and a point of time of detection of zero cross at several positions is produced by an impact from sampling and does not affect the benefit and advantage of this embodiment. The Q signal is a signal orthogonal to the I signal so that the change of the Q signal is equivalent to the change of the I signal. Thus, the following description focuses on the I signal.

As shown in FIG. 5, the I signal will have a waveform commensurate with the frequency of the FM signal, when a desired wave is received. In the absence of signals, on the other hand, the I signal changes fast and randomly due to the noise as shown FIG. 6. Therefore, the probability of the amplitude changing from positive to negative across zero and changing from negative to positive across zero will be higher than when a desired wave is received. Therefore, the number of times of zero crosses in the same period of time is larger in FIG. 6 than in FIG. 5. In this embodiment, it is determined that a desired wave is not identified if the number of times of zero crosses in a predetermined period of time is larger than an upper limit value.

Reference is made back to FIG. 1. The zero cross detection unit 38 may detect the number of times of zero crosses in a predetermined period of time of a differential signal derived from differentiating a signal subjected to quadrature detection, i.e., a differential signal derived from differentiating at least one of the I signal and the Q signal. The zero cross detection unit 38 determines a differential signal by differentiating at least one of the I signal and the Q signal with respect to time. To be more specific, the zero cross detection unit 38 defines, as a differential value, a difference between the value of at least one of the I signal and the Q signal in each sampling session and the value of at least one of the I signal and the Q signal in the immediately previous sampling session. The zero cross detection unit 38 defines, as a differential signal, a signal comprised of a continuous set of differential values at respective sampling sessions. Even when the I signal or the Q signal contains a DC offset and so produces a period of time without zero crosses, this approach eliminates an impact from the DC offset and makes it easy to detect random changes of the signal. Accordingly, the precision of determination can be increased.

Further, when the zero cross detection unit 38 detects the number of times of zero crosses of one of the I signal and the Q signal in a predetermined period of time, the volume of calculation can be decreased. When the zero cross detection unit 38 detects the number of times of zero crosses of both the I signal and the Q signal in a predetermined period of time, the number of data items is increased so that the precision of determination can be increased.

The zero cross detection unit 38 may detect, as the number of times of zero crosses, only one of the number of times that the value of the signal changes from positive to negative via zero and the number of times that the value of the signal changes from negative to positive via zero. In this case, the volume of calculation can be decreased.

The signal determination unit 40 determines whether the signal subjected to quadrature detection is a reception signal by comparing the signal intensity detected by the intensity detection unit 36 with a first threshold value and comparing the number of times of zero crosses detected by the zero cross detection unit 38 with a predetermined range. The reception signal corresponds to a desired wave. To describe it in further details, a reception signal is a signal that should be detected by the FM detection unit 16 described later and is a signal modulated and transmitted in a radio format that can be demodulated in the reception apparatus 1.

The first threshold value and the predetermined range may be determined by, for example, simulation computation, etc. The predetermined range can be defined in accordance with, for example, the bandwidth of the I signal and the Q signal and the configuration of the reception apparatus 1.

When the signal intensity detected by the intensity detection unit 36 is equal to or higher than the first threshold value and when the number of times of zero crosses detected by the zero cross detection unit 38 is within the predetermined range, the signal determination unit 40 determines that the signal subjected to quadrature detection is a reception signal.

When the detected signal intensity is lower than the first threshold value or when the detected number of times of zero crosses is not within the predetermined range, the signal determination unit 40 determines that the signal subjected to quadrature detection is not a reception signal. The signal that is not a reception signal represents a noise. As described above, the signal subjected to quadrature detection moves randomly on an orthogonal plane in the case of a noise. Therefore, the number of times of zero crosses will be larger than the upper limit of the predetermined range. In the case of a reception signal, on the other hand, the upper limit of angular speed on the orthogonal plane is determined by the modulation index (symbol rate) so that the number of times of zero crosses will be smaller as compared with the case of a noise.

Further, when the number of times of zero crosses is smaller than the lower limit value of the predetermined range, it means that the frequency of signal change is smaller as compared with the case in which the FM detection unit 16 receives a signal that should be detected. Therefore, the signal subjected to quadrature detection is not a signal that should be detected by the FM detection unit 16 so that the signal determination unit 40 determines that a reception signal is not identified. If it is not necessary to exclude such a signal, the lower limit of the predetermined range may be zero.

The signal determination unit 40 may determine whether the number of times of zero crosses is within a predetermined range only when the detected signal intensity is equal to or higher than the first threshold value. Alternatively, the signal determination unit 40 may determine whether the detected signal intensity is equal to or higher than the first threshold value only when the number of times of zero crosses is within the predetermined range.

When it is determined that a reception signal is identified, the signal determination unit 40 directs the switching unit 14 to start the process. When it is determined that a reception signal is not identified, on the other hand, the signal determination unit 40 does not direct the switching unit 14 to start the process. Further, the signal determination unit 40 outputs a result of determination to the audio control unit 20 and the channel scan control unit 34.

When the switching unit 14 is not directed by the signal determination unit 40 to start the process, the switching unit 14 does not output the I signal and the Q signal supplied from the quadrature detection unit 12 to the FM detection unit 16 and stops the operation of the FM detection unit 16, the analog reception process unit 18, the audio control unit 20, and the noise squelch determination unit 32. In this case, the signal detection unit 30 operates at a clock of a relatively low first frequency. This reduces the current consumed during the stand-by operation.

When directed by the signal determination unit 40 to start the process, the switching unit 14 outputs the I signal and the Q signal supplied from the quadrature detection unit 12 to the FM detection unit 16 and starts the operation of the FM detection unit 16, the analog reception process unit 18, the audio control unit 20, and the noise squelch determination unit 32. In this case, the parts of the reception apparatus 1 operate at a clock of a second frequency higher than the first frequency.

The FM detection unit 16 subjects the I signal and the Q signal supplied from the switching unit 14 to FM detection and generates an FM detection signal that results from FM detection. For example, Arctan detection is performed for FM detection. Arctan detection makes it possible to demodulate a frequency modulated signal. A publicly known technology may be used for a detection process, and a description thereof is omitted. The FM detection unit 16 outputs the FM detection signal thus generated to the noise squelch determination unit 32 and the analog reception process unit 18.

The noise squelch determination unit 32 detects the noise level outside the demodulation bandwidth of the detection signal supplied from the FM detection unit 16 and determines whether the signal subjected to quadrature detection by the quadrature detection unit 12 is a reception signal, based on the detected noise level. A publicly known technology may be used for a process of detecting the noise level, and a description thereof is omitted. When the detected noise level is lower than a second threshold value, the noise squelch determination unit 32 determines that the signal is a reception signal. When the noise level is equal to or higher than the second threshold value, the noise squelch determination unit 32 determines that the signal is not a reception signal. The second threshold value may be determined by, for example, simulation computation, etc. The noise squelch determination unit 32 outputs the result of determination to the audio control unit 20 and the channel scan control unit 34.

The analog reception process unit 18 subjects the detection signal supplied from the FM detection unit 16 to a process such as D/A conversion for extracting a sound signal and outputs the sound signal thus obtained to the audio control unit 20.

The audio control unit 20 controls the sound signal supplied from the analog reception process unit 18 to be or not to be output to a sound output apparatus such as a speaker 22, based on the result of determination by the signal determination unit 40 and the result of determination by the noise squelch determination unit 32.

To describe it further details, the audio control unit 20 does not output the sound signal to the speaker 22 to mute the sound signal when the signal determination unit 40 determines that a reception signal is identified and the noise squelch determination unit 32 determines that a reception signal is not identified. When the signal determination unit 40 determines that a reception signal is identified and the noise squelch determination unit 32 determines that a reception signal is identified, on the other hand, the audio control unit 20 outputs the sound signal to the speaker 22 to unmute the sound signal.

The channel scan control unit 34 controls channel scan for changing the channel received by the quadrature detection unit 12 to another channel, based on the result of determination by the signal determination unit 40 and the result of determination by the noise squelch determination unit 32. Channel scan is a function for successively switching the channel received by the reception apparatus 1 to receive a channel in which a sound signal can be generated in a predetermined time-out period.

When the signal determination unit 40 does not determine that a reception signal is identified in a predetermined first period of time, the channel scan control unit 34 changes the channel after an elapse of the first period of time. The first period of time can be called a first time-out period and may be, for example, about 30 ms.

FIG. 7 shows an operation of the channel scan control unit 34 of FIG. 1 in the absence of signals. The operation of FIG. 7 takes place in the absence of ambient noise. It is highly probable that the operation of FIG. 7 takes place even when the level of ambient noise is relatively high. When channel CH1 is in use, the signal determination unit 40 continues to determine that a reception signal is not identified during the first period of time, and the channel scan control unit 34 switches from channel CH1 to channel CH2 at a point of time when the first period of time elapses. Since the signal determination unit 40 determines that a reception signal is not identified, the noise squelch determination unit 32 does not perform a determination process. Similarly, when channel CH2 is in use, the signal determination unit 40 continues to determine that a reception signal is not identified during the first period of time, and the channel scan control unit 34 switches from channel CH2 to channel CH3 at a point of time when the first period of time elapses.

When the signal determination unit 40 determines that a reception signal is identified and the noise squelch determination unit 32 does not determine that a reception signal is identified in a predetermined second period of time longer than the first period of time, the channel scan control unit 34 changes the channel when the second period of time elapses. The second period of time is longer than a period of time required for the noise squelch determination unit 32 to determine whether a reception signal is identified. The second period of time can be called a second time-out period and may be, for example, about 150 ms.

Figure 8:
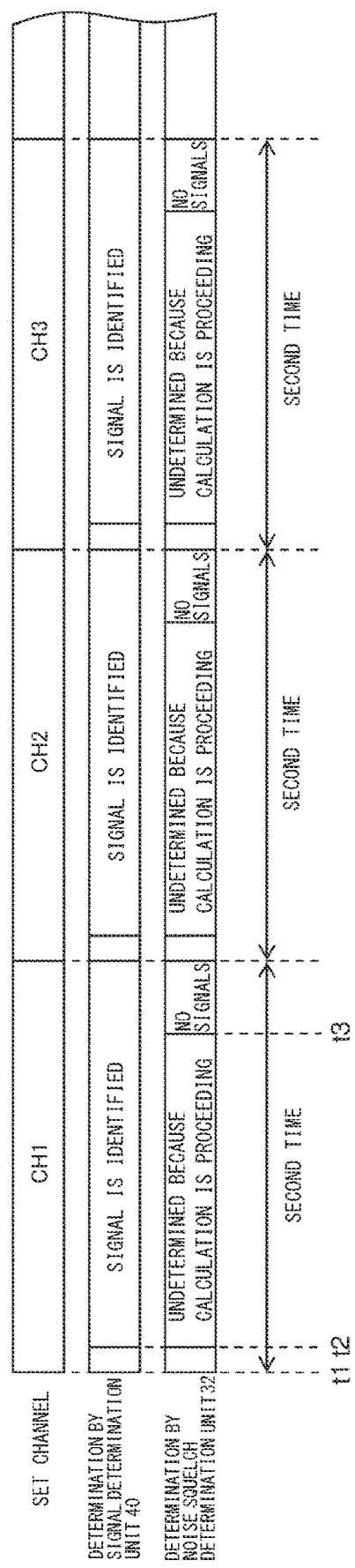
FIG. 8 shows an operation of the channel scan control unit of FIG. 1 performed when the signal determination unit determines that a reception signal is identified in the absence of signals.

FIG. 8 shows an operation of the channel scan control unit 34 of FIG. 1 performed when the signal determination unit 40 determines that a reception signal is available in the absence of signals. The signal determination unit 40 determines that a reception signal is identified at a point of time t2 when the period of time required for determination elapses since time t1, when the channel is set to channel CH1. In response to the result of determination, the noise squelch determination unit 32 starts a determination process since time t2. The noise squelch determination unit 32 determines that a reception signal is not identified at time t3 when the period of time required for determination elapses since time t2. Therefore, the channel scan control unit 34 switches from channel CH1 to channel CH2 at a point of time when the second period of time elapses since time t1. The process performed after the channel is switched to channel CH2 is similar. A determination as to whether a reception signal is identified can be made by the noise squelch determination unit 32 with a high precision, even when the signal determination unit 40 determines that a reception signal is identified in a situation where the level of ambient noise is high and a desired wave is absent.

When the signal determination unit 40 determines that a reception signal is identified and the noise squelch determination unit 32 determines that a reception signal is identified, on the other hand, the channel scan control unit 34 stops changing the channel. In other words, the current channel is maintained, and the reception apparatus 1 continues reception in that channel.

Figure 9:
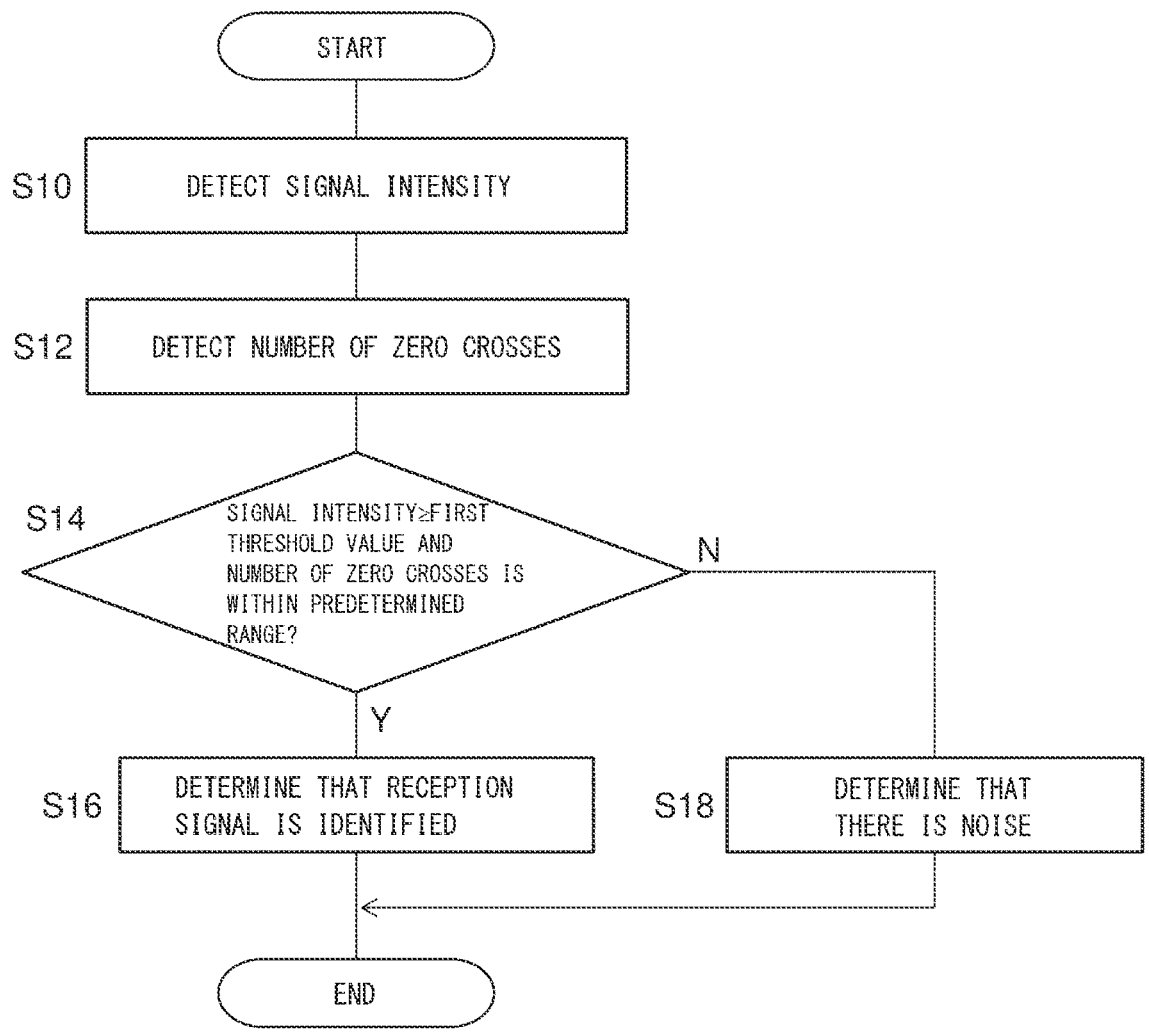
FIG. 9 is a flowchart showing steps for detection by the signal detection unit.

A description will be given of an operation of the reception apparatus 1 having the above-described configuration. FIG. 9 is a flowchart showing steps for detection by the signal detection unit 30. The intensity detection unit 36 detects the intensity of a signal subjected to quadrature detection (S10). The zero cross detection unit 38 detects the number of times of zero crosses of the signal subjected to quadrature detection in a predetermined period of time (S12).

When the signal intensity is equal to or higher than a first threshold value and when the number of times of zero crosses is within a predetermined range (Y in S14), the signal determination unit 40 determines that the signal is a reception signal (S16). When the signal intensity is not equal to or higher than the first threshold value or when the number of times of zero crosses is not within the predetermined range (N in S14), on the other hand, the signal determination unit 40 determines that the signal is a noise (S18).

Figure 10:
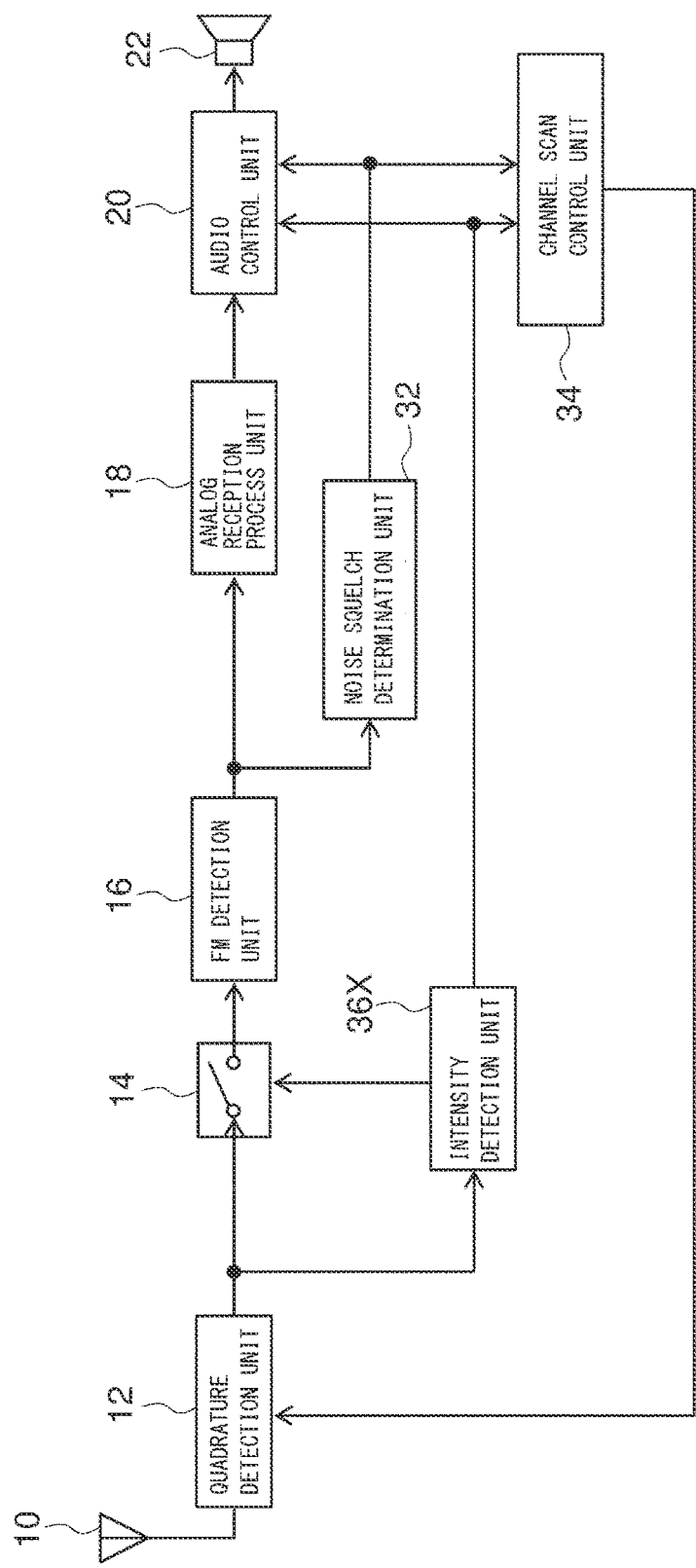
FIG. 10 shows a configuration of the reception apparatus according to a comparative example.

A description will now be given of the reception apparatus according to a comparative example. FIG. 10 shows a configuration of the reception apparatus 1X according to a comparative example. The comparative example differs from the embodiment in that the zero cross detection unit 38 and the signal determination unit 40 of FIG. 1 are not provided, and an intensity determination unit 36X is provided in place of the intensity detection unit 36 of FIG. 1. The reception apparatus 1X operates based on an operating clock. While standing by for reception, the intensity determination unit 36X performs carrier squelch determination at the operating clock of the first frequency and determines that a reception signal is identified when the intensity of a signal subjected to quadrature detection is equal to or higher than a threshold value. When the intensity determination unit 36X determines that a reception signal is identified, the operating clock is switched to the operating clock of the second frequency, and the FM detection unit 16, etc. starts the process. In this case, the intensity determination unit 36X determines in error that a reception signal is identified in an environment of no signals and relatively large ambient noise. Therefore, the reception apparatus will always operate at the operating clock of the second frequency, and the current consumed during the standby mode will be increased. In this case, channel scan is also affected such that, as shown in FIG. 8, the channel cannot be switched to a next channel until the determination process by the noise squelch determination unit 32 is completed and the second time elapses. Accordingly, the speed of channel scan is significantly reduced.

In the embodiment, on the other than, the probability that the signal determination unit 40 determines that a reception signal is identified in an environment of no signals and relatively large ambient noise is lower than in the comparative example. Accordingly, the probability that the FM detection unit 16, etc. operates is low, and the current consumption can be decreased. Another aspect of the embodiment is that, in an environment of no signals and relatively large ambient noise, the probability that the process of FIG. 7 is performed in channel scan is higher than the probability that the process of FIG. 8 is performed, and the probability that the process of FIG. 8 is performed is lower than in the comparative example. This makes it easy for channel scan to be performed at a high speed even in such an environment.

According to the embodiment, a determination as to whether a reception signal is identified is made based on the intensity and the number of times of zero crosses of a signal subjected to quadrature detection. Therefore, a determination can be made with a precision approximating that of noise squelch determination in a period of time commensurate with that of carrier squelch determination. In other words, a signal and a noise can be discriminated at a high speed and with a high precision.

Further, the number of times of zero crosses is detected so that the volume of calculation can be decreased, and a determination can be made in a signal process that requires a relatively low processing load. Therefore, the frequency of the operating clock of the signal detection unit 30 can be similar to that of the comparative example, and the current consumption necessary for detection of the number of times of zero crosses is relatively small.

Further, even in an environment of relatively large ambient noise in which a reception signal is identified in error merely by carrier squelch determination, the probability that it is properly determined that a reception signal is not identified is increased. Therefore, the probability that the noise squelch determination unit 32 performs a determination process during a reception standby mode can be lowered. Accordingly, the current consumption during a reception standby mode can be reduced. Further, since the probability that the noise squelch determination unit 32 performs a determination process during a reception standby mode is lowered, the scan speed is inhibited from dropping due to ambient noise during a channel scan operation.

Described above is an explanation based on an exemplary embodiment. The embodiment is intended to be illustrative only and it will be understood by those skilled in the art that various modifications to constituting elements and processes could be developed and that such modifications are also within the scope of the present invention.

For example, the operation of the FM detection unit 16, the analog reception process unit 18, the audio control unit 20, and the noise squelch determination unit 32 is stopped until the signal determination unit 40 determines that a reception signal is identified in the embodiment. Alternatively, these parts may continue the operation irrespective of the result of determination by the signal determination unit 40. In this case, the switching unit 14 may not be provided. When the signal determination unit 40 determines that a reception signal is not identified, the audio control unit 20 does not output a sound signal to the speaker 22 irrespective of the result of determination by the noise squelch determination unit 32. In this variation, control can be simplified.

What is claimed is:

1. A signal detection apparatus comprising:
a quadrature detection circuit that subjects a reception signal to quadrature detection;
an intensity detection circuit that detects a signal intensity by referring to an absolute value of an amplitude of a signal subjected to quadrature detection;
a zero cross detection circuit that detects the number of times of zero crosses of the signal in a predetermined period of time that is based on a modulation index of the reception signal; and
a signal determination circuit that determines that the signal is the reception signal when the signal intensity is equal to or higher than a threshold value and the number of times of zero crosses is within a predetermined range.

2. The signal detection apparatus according to claim 1, wherein
the zero cross detection circuit detects the number of times of zero crosses of a differential signal derived from differentiating the signal subjected to quadrature detection in a predetermined period of time that is based on the modulation index of the reception signal.

3. A reception apparatus comprising:
a quadrature detection circuit that subjects a reception signal to quadrature detection;
an FM detection circuit that subjects a signal subjected to quadrature detection by the quadrature detection circuit to FM detection so as to generate a detection signal;
a noise squelch determination circuit that detects a noise level outside a demodulation bandwidth of the detection signal generated by the FM detection circuit and determines whether the signal subjected to quadrature detection is the reception signal, based on the noise level detected;
an audio control circuit that controls a sound signal based on the detection signal generated by the FM detection circuit to be or not to be output; and
a signal detection circuit that detects whether the reception signal is identified, wherein
the signal detection circuit includes:
an intensity detection circuit that detects a signal intensity by referring to an absolute value of an amplitude of the signal subjected to quadrature detection;
a zero cross detection circuit that detects the number of times of zero crosses of the signal in a predetermined period of time that is based on a modulation index of the reception signal or the number of times of zero crosses of a differential signal derived from differentiating the signal subjected to quadrature detection in a predetermined period of time that is based on the modulation index of the reception signal; and
a signal determination circuit that determines that the signal subjected to quadrature detection is the reception signal when the signal intensity is equal to or higher than a threshold value and the number of times of zero crosses is within a predetermined range, wherein
the audio control circuit
does not output the sound signal when the signal determination circuit determines that the reception signal is not identified,
does not output the sound signal when the signal determination circuit determines that the reception signal is identified and the noise squelch determination circuit determines that the reception signal is not identified, and
outputs the sound signal when the signal determination circuit determines that the reception signal is identified and the noise squelch determination circuit determines that the reception signal is identified.

4. The reception apparatus according to claim 3, further comprising:
a channel scan control circuit that changes a channel received by the quadrature detection circuit, wherein
the channel scan control circuit
changes the channel when a predetermined first period of time elapses, provided that the signal determination circuit determines that the reception signal is not identified in the first period of time,
changes the channel when a predetermined second period of time longer than the first period of time elapses, provided that the signal determination circuit determines that the reception signal is identified and the noise squelch determination circuit does not determine that the reception signal is identified in the second period of time, and
stops changing the channel when the signal determination circuit determines that the reception signal is identified and the noise squelch determination circuit determines that the reception signal is identified.

5. A signal detection method comprising:
subjecting a reception signal to quadrature detection;
detecting a signal intensity by referring to an absolute value of an amplitude of a signal subjected to quadrature detection;
detecting the number of times of zero crosses of the signal in a predetermined period of time that is based on a modulation index of the reception signal or the number of times of zero crosses of a differential signal derived from differentiating the signal subjected to quadrature detection in a predetermined period of time that is based on the modulation index of the reception signal; and
determining that the signal is the reception signal when the signal intensity detected is equal to or higher than a threshold value and the number of times of zero crosses detected is within a predetermined range.

* * * * *